United States Patent [19]

Rowse et al.

[11] Patent Number: 5,565,910
[45] Date of Patent: Oct. 15, 1996

[54] DATA AND TELEVISION NETWORK FOR DIGITAL COMPUTER WORKSTATIONS

[75] Inventors: William T. Rowse, Belford; Daniel Marzullo, Sayerville; Floyd Brown, Parsippany; Gunnar Gunnarsson, Dumont, all of N.J.

[73] Assignee: Vionx, Inc., New York, N.Y.

[21] Appl. No.: 38,724

[22] Filed: Mar. 26, 1993

[51] Int. Cl.⁶ ................................................. H04N 7/15
[52] U.S. Cl. .................................. 348/15; 348/16; 370/62
[58] Field of Search .............................. ; 348/6, 12, 13, 348/14, 15, 16, 17, 705; 379/53, 54; 358/85, 86; 370/50, 53, 57, 58.1, 58.2, 60, 60.1, 62, 69.1, 77, 85.1, 124; 395/200; H04N 7/14, 7/15, 7/10/, 5/268

[56] References Cited

U.S. PATENT DOCUMENTS

| 4,564,940 | 1/1986 | Tahata. | |
| 4,847,829 | 7/1989 | Tompkins et al. | 370/62 |
| 4,885,747 | 12/1989 | Foglia. | |
| 5,010,399 | 4/1991 | Goodman et al. | |

FOREIGN PATENT DOCUMENTS

| 0488289 | 6/1992 | European Pat. Off. | 348/15 |
| 3319106 | 11/1984 | Germany | 370/53 |
| 0036838 | 2/1991 | Japan | 370/58.1 |
| 0085837 | 4/1991 | Japan | 370/62 |
| 0167788 | 6/1992 | Japan | H04N 7/15 |

OTHER PUBLICATIONS

Daskalakis, A "Key Systems for Picturephone ™ Service" Bell Laboratories Record pp. 270–277 Oct. 1971.

Primary Examiner—James J. Groody
Assistant Examiner—David E. Harvey
Attorney, Agent, or Firm—Furgang & Milde, LLP

[57] ABSTRACT

A data and television network for digital computer workstations that operate on a local area network (LAN) to exchange data. The network includes a private branch exchange (PBX) having a plurality of television ports for transmitting and receiving television signals, an electronic switch for selectively connecting each television port with any other television port, and a control computer (PC), connected to the LAN and to the switch, for decoding data messages received from a workstation via the LAN and controlling the interconnection of the television ports by the switch in response thereto. A software program, stored in and operable on the computer of each workstation, generates the data messages to be transmitted via the LAN to the control computer of the PBX.

26 Claims, 10 Drawing Sheets

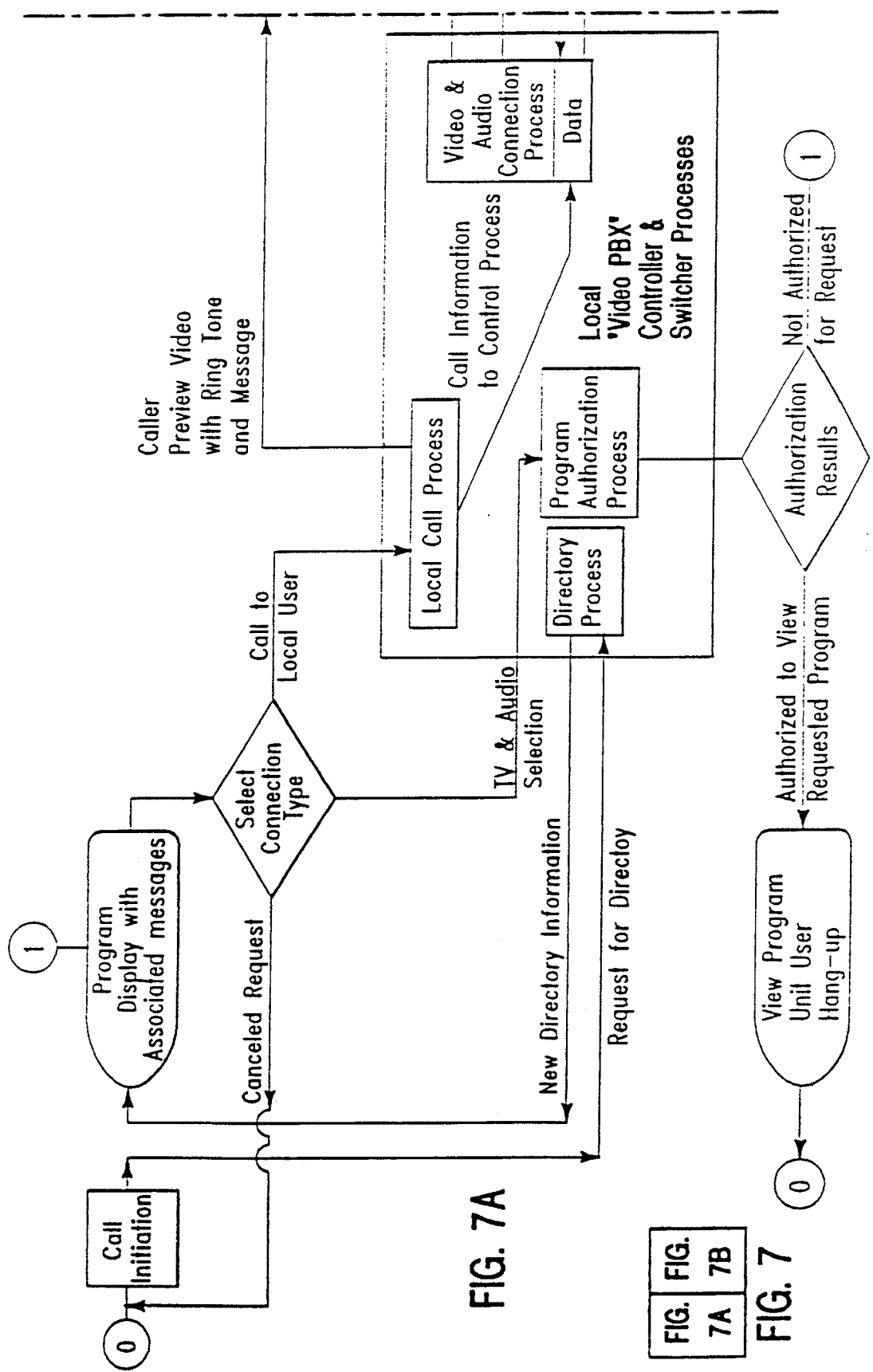

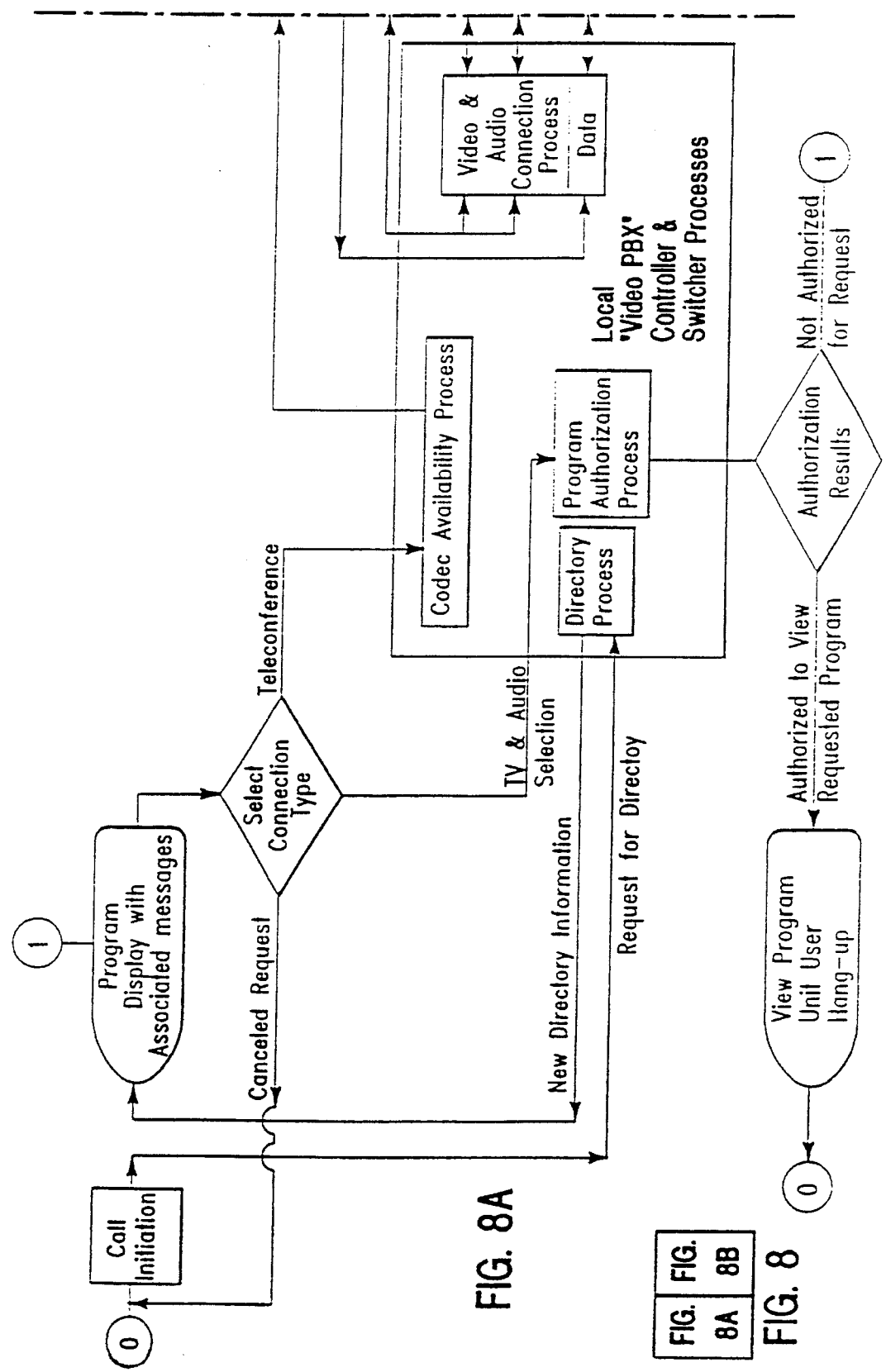

DATA AND TELEVISION NETWORK FOR DIGITAL COMPUTER WORKSTATIONS

CROSS REFERENCE TO RELATED APPLICATION

The subject matter of this application is related to that of the commonly assigned U.S. application Ser. No. 07/884,487 filed May 15, 1992 entitled "COMMUNICATION SYSTEM PROVIDING DATA AND TELEVISION SIGNALS TO PC WORKSTATIONS" (now U.S. Pat. No. 5,283,789).

BACKGROUND OF THE INVENTION

The present invention relates, generally, to a communication network or system for transmitting both data and television signals between a plurality of digital computer workstations. More particularly, the invention relates to a communication system that employs an industry standard local area network (LAN) for transmitting data and which makes provision for the selective transmission of television signals between user workstations connected on the LAN as well as between a given workstation and a selected remote workstation which is not connected to the LAN.

As so-called "multimedia" are incorporated into digital computer workstations (also known as desktop computers, personal computers or "PCs") it becomes possible to use such workstations for "videoconferencing" with the users of one or more similar workstations at either nearby or remote locations. To achieve this capability, a workstation must include, as a minimum:

(1) a digital display (e.g., CRT display);

(2) a sound transducer (e.g., loudspeaker);

(3) a digital computer for processing data, connected to supply image and control signals to the digital display for imaging data;

(4) a circuit for converting the video portion of the TV signal into image and control signals compatible with the digital display for displaying a picture on this imaging device; and (5) an analog amplifier or the like which provides the proper gain and impedance for driving the loudspeaker with the audio portion of the TV signal.

A conversion circuit of the aforementioned type, which digitizes an analog video signal and formats this digitized signal in such a way as to permit display of the video image on a digital computer display, is well known. Such a circuit is available for both the PS/2 computer of International Business Machines Corp. and the MacIntosch computers of Apple Computer Corp. The circuit useable with the PS/2 computers is sold by IBM under the part number PN-34F3087.

If two-way communication with the digital computer workstation is desired, it is necessary also to provide the workstation with a video camera, aimed appropriately at the workstation user, for producing a video signal representing the image of the workstation user, and a microphone arranged to pick up the voice of the workstation user and to generate an analog audio signal in response thereto.

The term "television signal" or "TV signal", as used herein, is intended to mean a conventional NTSC (or other standard) signal which includes both a video and an audio portion. The terms "video signal" and "audio signal" will be used to separately denote only the video portion and audio portion, respectively, of the television signal. As is well known, the video portion, at baseband, lies within a frequency range of 0 to 4.75 MHz whereas the audio portion lies within a frequency of 0 to 15 KHz. As desired, these video and audio signals can be combined and modulated upward to a 6 MHz wide channel within a broadband spectrum of 100 to 550 MHz.

Similarly, a broadband (100–550 MHz) television signal containing one or more active channels can be tuned and demodulated to produce the video and audio portions (signals) of a single television signal at baseband.

As used herein, the term "baseband signals" is intended to define information signals within the frequency range of 0 to 100 MHz. Computer data is normally transmitted by baseband signals. The term "broadband signals" is thus intended to mean information signals at a frequency higher than the highest baseband frequency—typically in the frequency range of 100 to 550 MHz. Television is normally transmitted by broadband signals in the frequency range of 50 to 450 MHz. If the upper limit of the baseband range terminates at 50 MHz, the lower limit of the broadband range can commence at this frequency.

It is known to transmit both baseband and broadband signals on a common "backbone communication network" such as a local area network (LAN) which is connected to a plurality of user workstations. The U.S. Pat. No. 4,885,747 to Foglia discloses a so-called "filter coupler" or "F-coupler" by which baseband signals (data) are transmitted between a backbone network and a given workstation via a twisted pair shielded cable in a balanced mode and broadband (television) signals are transmitted between the same backbone network and the same workstation via the same shielded cable in an unbalanced mode. The disclosure of this U.S. patent is incorporated herein by reference.

With the Foglia system, a number of television programs (satellite television, VCR or a "live" broadcast from a television camera) is "broadcast" to all workstations connected to the LAN (an IBM token ring, in this case) from a coaxial cable through a so-called "tap/combiner". While each workstation can select one from a number of television channels that are broadcast on the broadband frequencies, and while it is even possible for a workstation to broadcast to all other workstations by means of a TV camera or some other program source, it is not possible for any particular workstation to transmit television signals to any particular workstation or workstations on the LAN, or to transmit to any remote workstation not connected to the LAN, thereby to provide true videoconferencing capability.

The U.S. Pat. No. 4,564,940 to Yahata discloses a so-called "broadband network system" which includes a private branch exchange (PBX) for interconnecting a plurality of workstations. However, this system is intended to replace an industry standard local area network (LAN) for the multiplex communication of voice and data. No consideration is given to the special problems encountered by the transmission of television signals.

SUMMARY OF THE INVENTION

A principal object of the present invention, therefore, is to provide a data and television network for digital computer workstations which enables each workstation to enter into a videoconference with any other selected workstation.

It is a further object of the present invention to provide videoconferencing capability among a plurality of workstations which are all connected on a common LAN.

It is a further object of the present invention to enable a plurality of workstations to conduct a videoconference with a workstation or videoconferencing site at a remote location.

It is a further object of the present invention to enable any one of a plurality of workstations to select television programming from one of a plurality of programming sources.

These objects, as well as other objects which will become apparent for the discussion that follows, are achieved, by providing a private branch exchange (PBX) having a plurality of television ports for transmitting and receiving television signals, an electronic switch for selectively connecting each television port with any other television port, and a control computer (PC), connected to the LAN and to the switch, for decoding data messages received from a workstation via the LAN and controlling the interconnection of the television ports by the switch in response thereto. A software program, stored in and operable on the computer of each workstation, generates data messages to be transmitted via the LAN to the control computer of the PBX.

For a full understanding of the present invention, reference should now be made to the following detailed description of the preferred embodiment of the invention as illustrated in the accompanying drawings.

DESCRIPTION OF THE PREFERRED EMBODIMENTS

Figure 1:
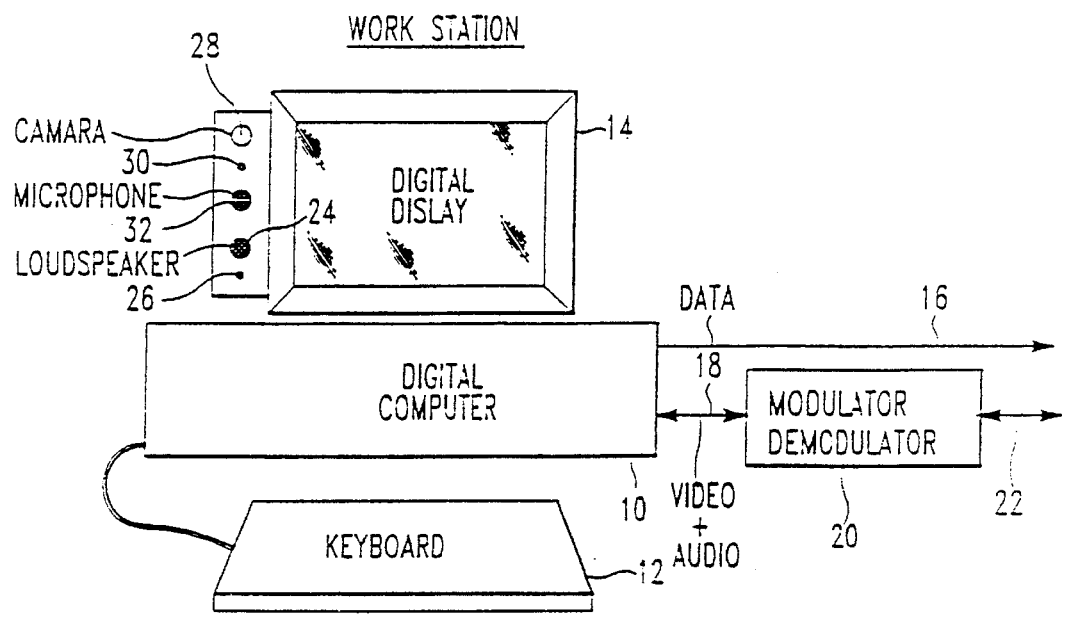
FIG. 1 is a representative diagram showing a digital computer workstation of the type employed with the data and television network according to the present invention.

The preferred embodiments of the present invention will now be described with reference to FIGS. 1–9 of the drawings. Identical elements shown in the various figures are identified with the same reference numerals.

FIG. 1 shows a digital computer workstation of the type utilized in connection with the data and television network according to the present invention. The workstation comprises a digital computer 10 having a keyboard 12 and a digital display 14. In addition to the keyboard, the computer may include a "mouse", a touch sensitive screen and/or any other conventional input device for operating the computer.

The computer is connected to a local area network (LAN) via a data transmission line 16. The local area network may be an IBM token ring, an Ethernet or some other standard or non-standard means of connecting a plurality of workstations together. This local area network normally has a "hub" or central point at which all the transmission lines 16 from the various workstations come together.

In addition to the data transmission line 16, which is preferably a standard four wire shielded cable (IBM cabling system type 9 cable) for providing duplex transmission, the computer may be provided with a television transmission line 18. This transmission line is in fact four separate cables (for example, 75 Ohm type RG-59 coaxial cables or type 4 or 5 unshielded twisted pair wires) two for the video signal in each direction and two for the audio signal. The cables 18 are connected to a modulator/demodulator 20, the purpose and function of which will be described in detail hereinbelow. The mod/demod unit 20 transmits and receives a television signal on the transmission line(s) 22.

The analog video signal received at the workstation is supplied to an electronic circuit within the digital computer which digitizes the analog signal and formats this digitized signal in such a way as to permit display of the video images on the digital computer display 14. A commercial circuit of this type, useable with IBM PS/2 computers, is sold by IBM under the part number PN-34F3087.

The audio portion of the television signal received by the workstation is supplied through a suitable amplifier to a loudspeaker 24. The loudness of the sound produced by the loudspeaker may be controllable by means of a volume control knob 26.

The video images transmitted by the workstation are generated by a video camera 28. This camera, which is aimed at the workstation user, may be turned on and off, as desired by the user, by commands entered into the computer, for example via the keyboard 12, or by a separate "on/off" switch on the camera. Whenever the camera is "on", this status is indicated by the illumination of a red lamp 30.

Finally, the audio portion of the television signal transmitted by the workstation is picked up by a microphone 32. The signal produced by the microphone is amplified and supplied as the outgoing audio signals on the transmission line 18.

Figure 2:
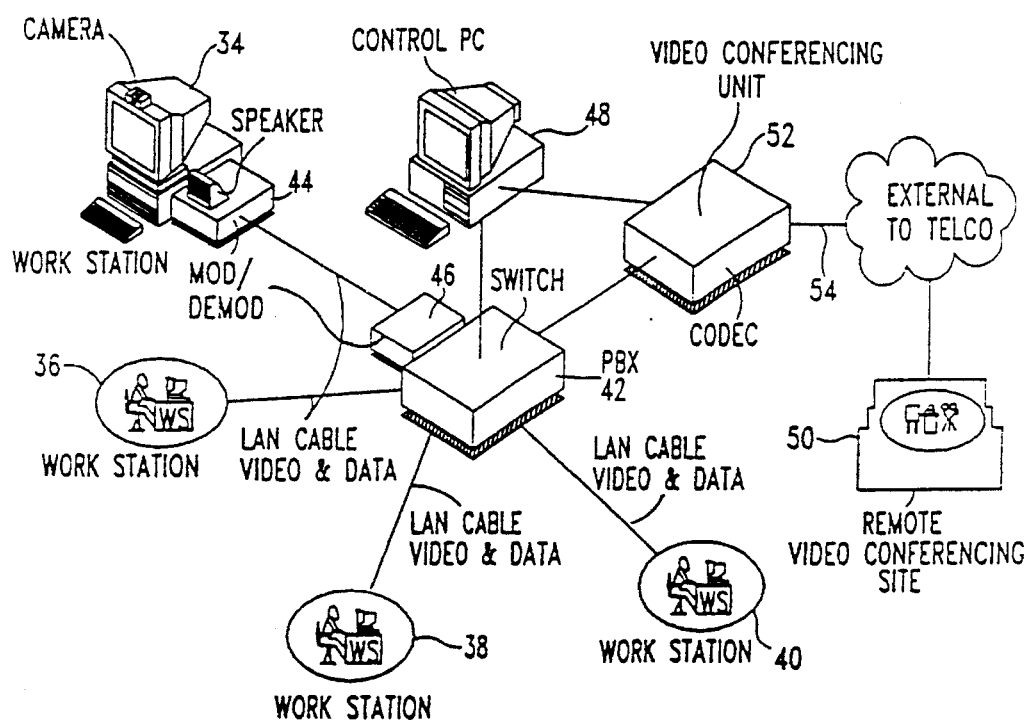
FIG. 2 is a block diagram of the television portion of the network according to the present invention.

A workstation of the type shown in FIG. 1 is useable with similarly equipped workstations, both within the local area network and beyond, to form a desktop videoconferencing network. FIG. 2 illustrates the architecture of the television portion of such a network. As is there shown, four workstations 34, 36, 38 and 40 are connected in a star configuration to a PBX switch 42. The connection is preferably made through mod/demod units 44 and 46, for reasons which will be explained hereinbelow; however, the connections could also be made directly using suitable (e.g., RG-59) cables or via dedicated LAN cables using baluns. The switch 42 is controlled by a separate digital computer 48 which responds to decoded data messages received from the individual workstations 34–40 via the LAN.

The system, as just described, enables any workstation to be connected to any one or more of the other workstations within the LAN area. For example, the user of workstation 34 can call the user of workstation 38 and conduct a two station video conference. Alternatively, the user of workstation 34 can "broadcast" to all of the remaining workstations 36, 38 and 40.

If the user of workstation 34 wishes to transmit or receive television signals to or from a remote location, such as the remote videoconferencing site 50, this is accomplished by connecting the respective workstation via the switch 42 to a digital coder/decoder 52 which, in turn, is connected to a telephone trunk line 54. The codec 52 digitizes and compresses the television signal, for example to 112 KBS or even 56 KBS, for transmission via the commercial telephone network ("Telco"). If it is desired to conduct more than one videoconference with a remote location at the same time, additional codecs can be connected between the switch 42 and a telephone trunk, as desired. Use of a plurality of codecs, which are accessible to and shared by all of the workstations, provides the advantage of "pooling"; that is, each codec will support a number of workstations.

Figure 3:
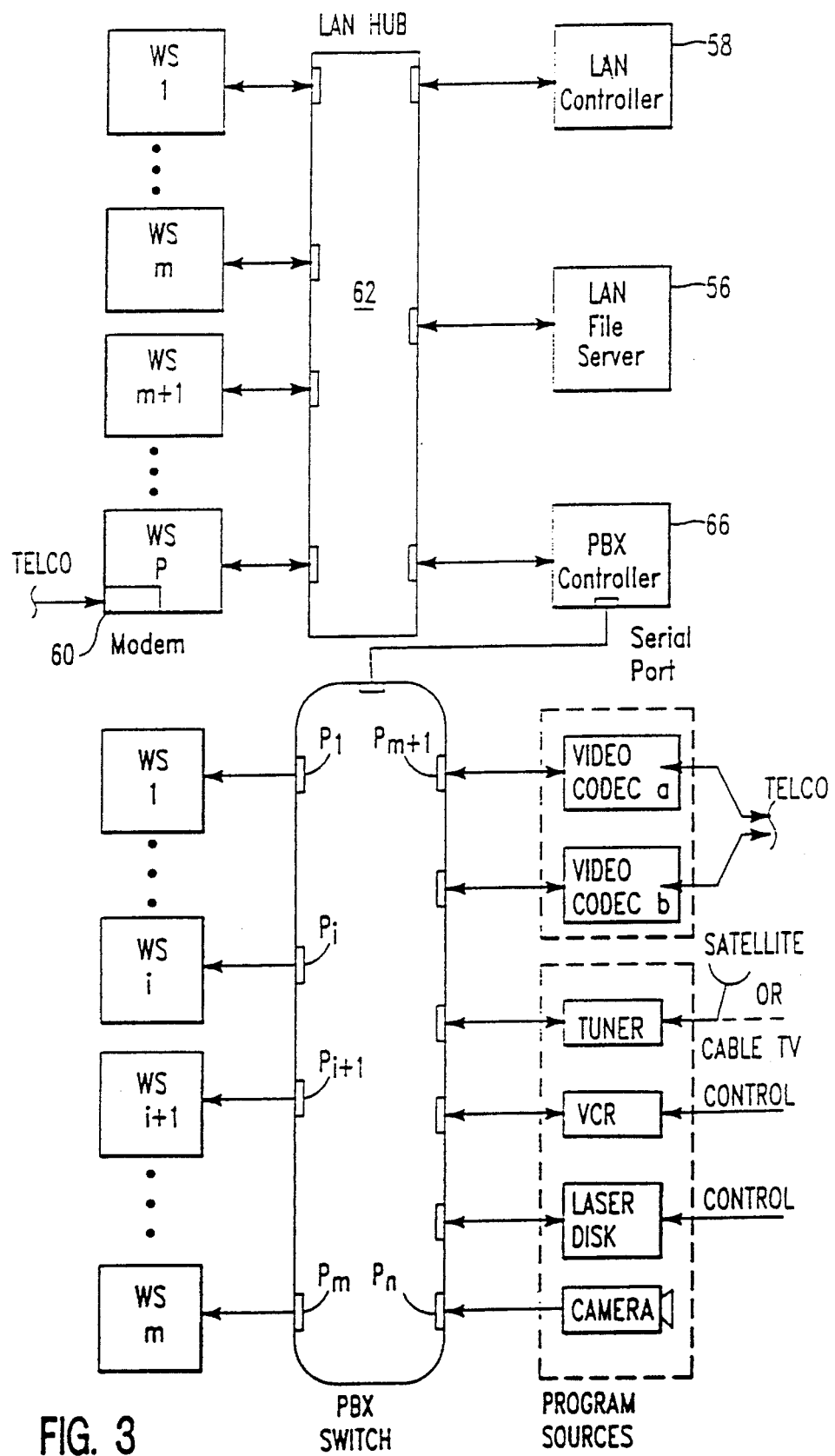
FIG. 3 is a block diagram of the data and television network according to the present invention.

FIG. 3 illustrates the principal elements of the data and television network according to the invention for implementing the architecture shown in FIG. 2. As shown in the left hand side of the figure, the system can comprise an arbitrary number (n) of workstations (WS) which have videoconferencing capability and an arbitrary number (p-n) of workstations which operate only with data. All of these workstations are connected into the local area network (LAN) via conventional LAN cabling. The LAN may, for example, be a token ring (STP) or an Ethernet (UTP) LAN. It may, for example, utilize Novell Netware and operate with a LAN file server—that is, a digital computer dedicated to controlling mass data storage and retrieval—and a LAN controller. One or more of the workstations may be individually provided with a modem 60 for direct data transmission to a computer outside the local network via the telephone network (Telco).

The LAN cabling is preferably concentrated at a central point at a "LAN hub" 62.

All of the workstations provided with video conferencing capability—that is, $WS_1 \ldots WS_i$, $WS_{i+1} \ldots WS_n$ are connected via their television transmission lines to a PBX switch 64. This PBX switch has a number of television signal ports $P_1 \ldots P_n$, $P_{n+1} \ldots P_p$, which are two way transmission ports for baseband television signals. Each port may be connected to any one or more of the other ports by suitable control of the PBX switch. This control is effected by a digital computer (personal computer) 66 which is connected on the LAN and also connected to the PBX switch via its RS-232 serial data port. This computer 66, which may be used for other tasks as well, will hereinafter be referred to as the "PBX controller".

The PBX controller can be any conventional, small digital computer such as a IBM PS/2 or Apple MacIntosch computer. The PBX switch is also available commercially. It may, for example, be the AKAI DP 2000 digital patch bay, with an optional RS-232 serial data port.

The PBX controller is connected to the LAN via a standard LAN interface.

In addition to the workstations, one or more codecs (codec a . . . codec b) may connect respective ports of the switch to telephone trunks. It will be understood that the codecs may, in turn, be connected to the telephone trunks via a telephone private branch exchange (PBX) or an inverse multiplex system.

In addition, one or more program sources may be connected to other respective ports of the switch 64. One or more channels of television programming received via satellite or cable may be selected via one or more tuners and supplied to a switch port. Similarly, a video cassette recorder may be selected by a workstation user for recording or playback of videoconferencing signals. A laser disk jukebox, which may be controlled manually or by selection from a workstation, may be connected to supply television programming to the switch. Finally, live television programming, such as a videoconference originating from a video-conferencing room may be generated using a television camera and supplied to the switch.

It is, of course, also possible to deliver audio programming, without the video.

The data and television network shown in FIG. 3 is controlled entirely by software residing in each of the workstations $WS_1 \ldots WS_n$ which are connected to the switch and in the PBX controller 66. The workstations $WS_1 \ldots WS_n$ communicate with the PBX controller via the LAN. As will be described in detail hereinbelow, the software program residing in each workstation is responsive to the workstation user to generate data messages and transmits these messages via the LAN to the PBX controller 66. The PBX controller, in turn, decodes these messages and controls the interconnection of the various ports of the switch via its serial data interface.

It will be seen that some of the workstations $WS_1 \ldots WS_i$ connected to the PBX switch are operative only to receive television signals. These workstations are not provided with a camera and microphone, enabling them to engage in a two-way videoconference. They can, however, monitor any videoconference and are capable of receiving any of the television programming produced by the program sources.

The remaining workstations $WS_{i+1} \ldots WS_n$ incorporate a camera and microphone and are thereby capable of originating a television signal.

Figure 4:
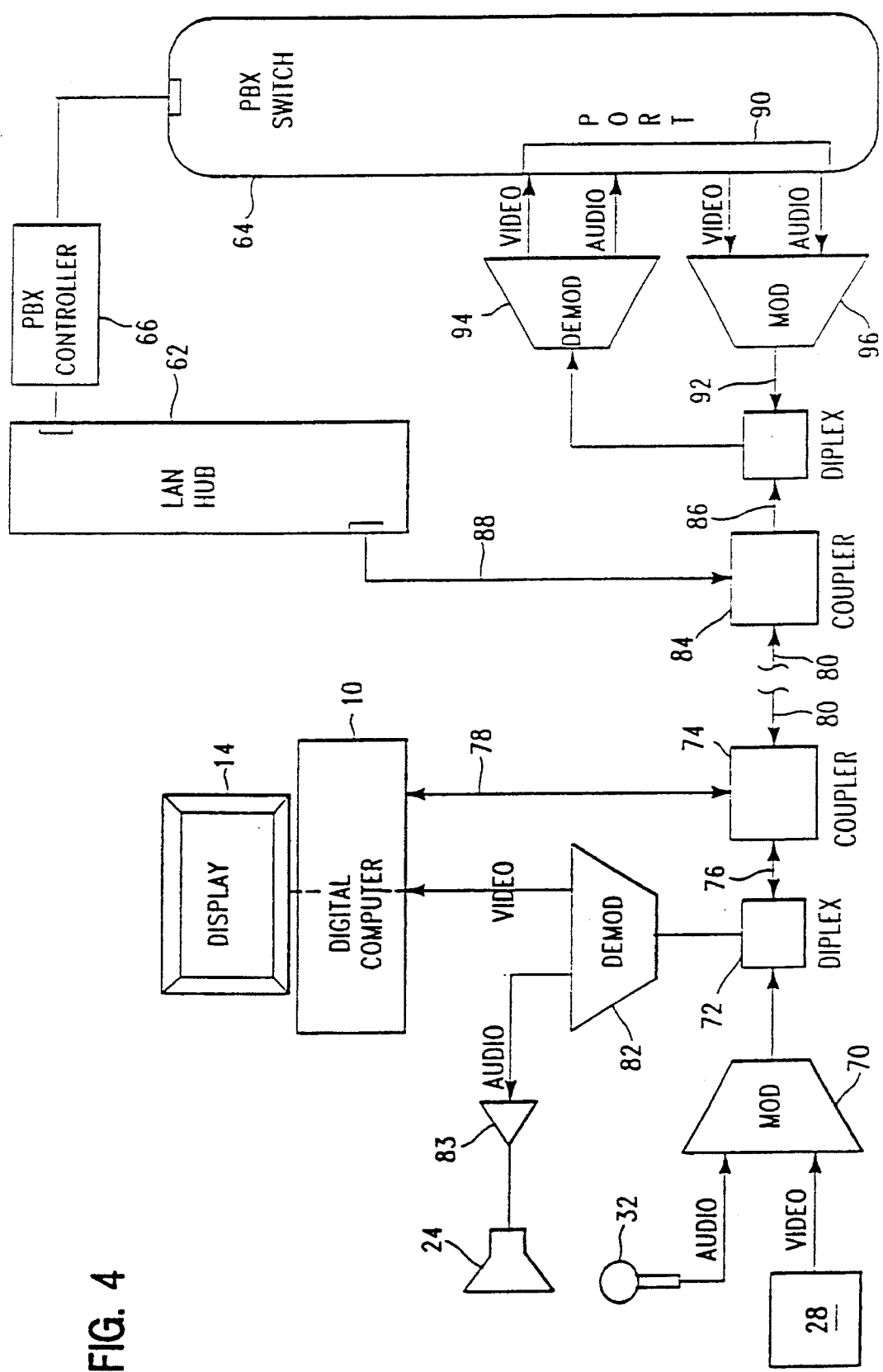
FIG. 4 is a block diagram showing the data and television network of FIG. 3 in greater detail.

FIG. 4 shows the preferred embodiment of the present invention whereby all television signals are transmitted between each workstation and the PBX switch via the existing LAN cabling. More particularly, FIG. 4 illustrates how a single digital computer workstation of the type shown in FIG. 1 may be connected to the LAN hub 62 and PBX switch 64, as shown in FIG. 3. The video and audio signals generated by the camera 28 and microphone 32, respectively, are supplied to a modulator 70 which combines the video and audio signals and modulates the resulting television signals up to an available 6 MHz wide channel within the broadband spectrum of 250–450 MHz. This signal is passed through a diplexer 72 and to a coupler 74 for transmission to the PBX switch 64.

The diplexer 72 is simply a signal combiner or divider device with two signals in and one out or one signal in and two out. The coupler 74 serves to couple both the television signals received on line 76 and the data signals received from the computer 10 on line 78 onto the LAN cable 80. Suitable couplers which may be used for this purpose are disclosed in the aforementioned U.S. Pat. No. 4,885,747 to Foglia and the aforementioned U.S. patent application Ser. No. 07/884,487 filed May 15, 1992, and now pending. Television signals received from the LAN cable 80 via the coupler 74 are diverted by the diplexer 72 to a demodulator 82. The demodulator operates in the reverse manner to the modulator 70, converting a television signal on a 6 MHz channel into its video and audio components. The video portion is supplied to the circuit card within the digital computer which digitizes and formats the analog image information into signals suitable for driving the display 14. The audio portion is passed through an amplifier 84 to the loudspeaker 24.

At the central location containing the LAN hub 62 and PBX switch 64, the signal processing is essentially similar. A coupler 84, identical to the coupler 74, breaks out the television signals on line 86 and the data on line 88. The data signals are passed to an available port of the LAN hub 62, while the television signals are passed to a port 90 of the PBX switch 64.

Each port 90 of the PBX switch 64 actually has four separate port connections: two for the video/audio pair signals received from a workstation and two for the video/audio pair signals to be transmitted to a workstation. The signals received from the workstation are separated out by the diplexer 92 and demodulated by the unit 94. The signals transmitted to the workstation are modulated by the unit 96 then passed to the diplexer 92.

As mentioned previously, the signals transmitted from the workstation to the PBX switch, and the signals transmitted from the PBX switch to the workstation, are preferably transmitted on 6 MHz wide channels within the 100–550 MHz broadband spectrum. Alternatively, these signals can be transmitted via dedicated cables at the baseband frequencies 0–4.75 MHz.

Figure 5:
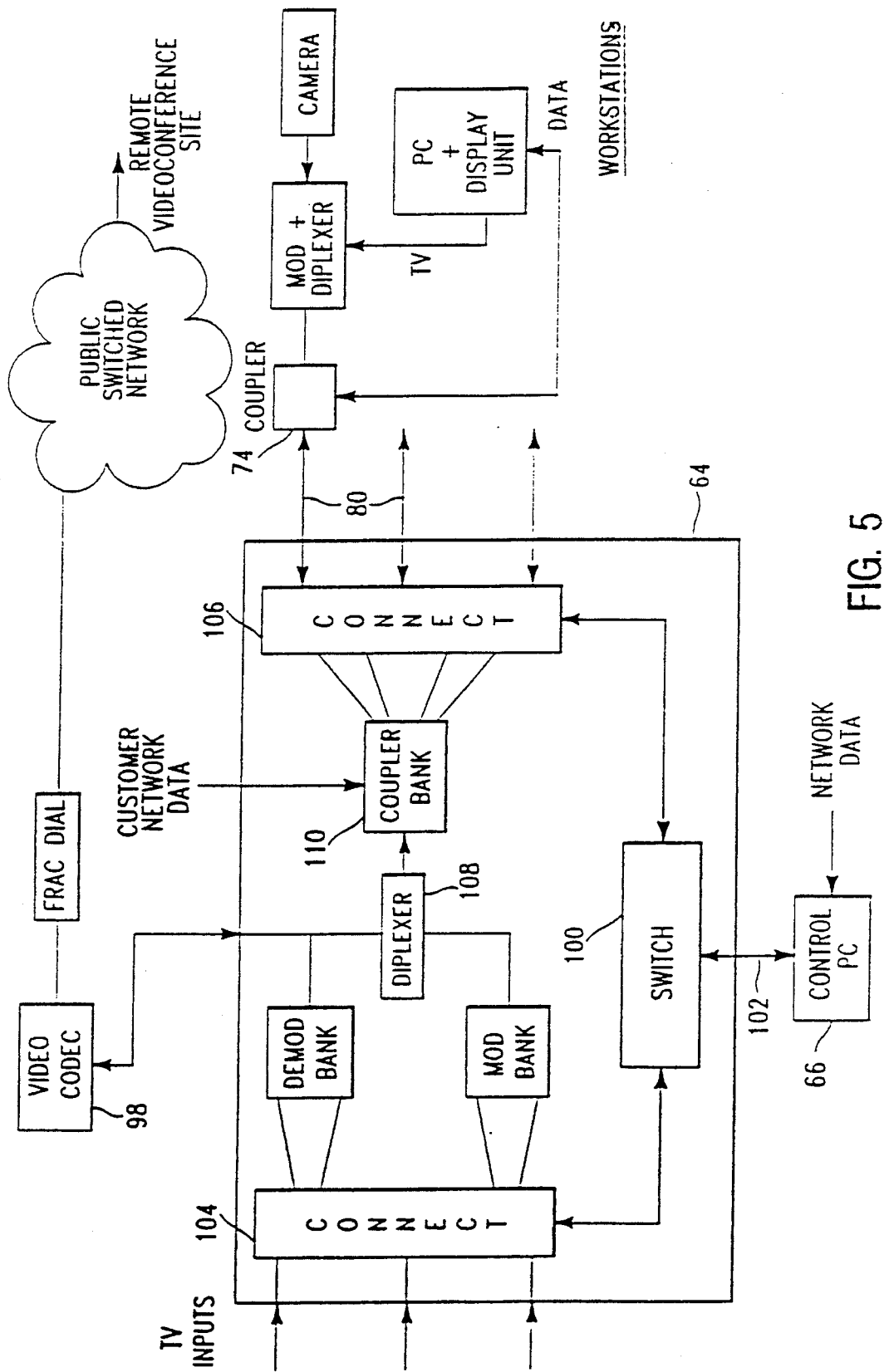
FIG. 5 is a block diagram showing further details of the data and television network.

FIG. 5 illustrates how a video codec 98 may be connected to the PBX switch 64. In this case, the workstations are connected to the PBX switch 64 via the LAN cabling 80 in the manner illustrated in FIG. 4 and described above. The PBX controller 66 passes commands to a switch decoder 100 via the RS-232 data link 102. The switch decoder, in turn, executes the commands by opening and closing the respective transistor switches within the interface units 104 and 106. The video codec 98 is connected to a diplexer 108 which passes the analog signal between the connection banks 104 and 106. A coupler bank 110 is a manual patch which connects the switch bank 106 with the diplexer 108 in accordance with the network data provided by the user.

Figure 6:
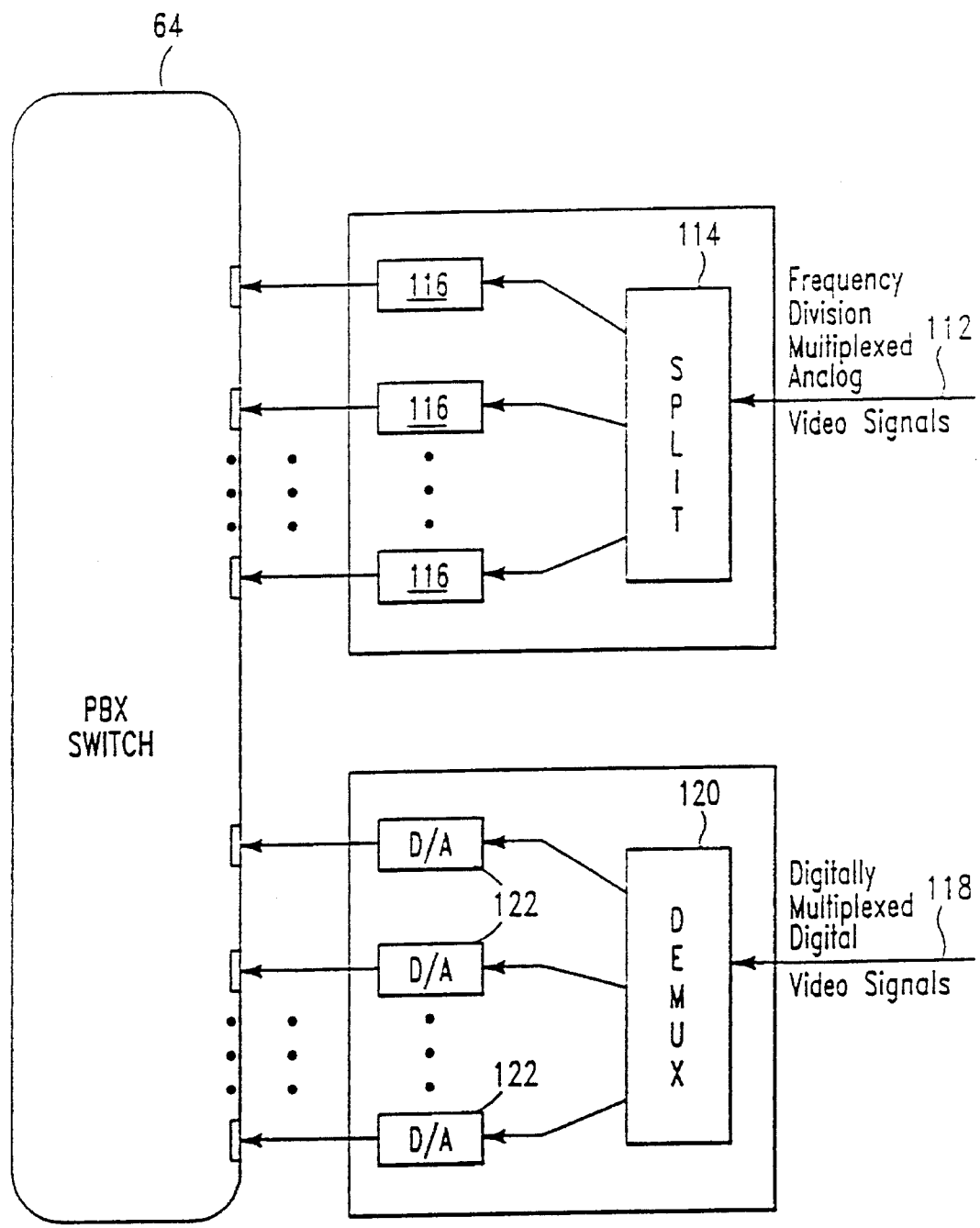
FIG. 6 is a block diagram showing a plurality of analog and television sources connected to the PBX switch.

FIG. 6 illustrates how the data and television network according to the present invention can be used to select program sources for workstations from among a large number of such sources. Standard cable television, which is frequency division multiplexed analog television, is required on a cable 112. The signal received is split into a plurality of signals, equal to the number of television channels, by a splitter 114. The signals are passed to separate demodulators, each tuned to convert a particular channel to the baseband frequencies (0–4.75 MHz). The demodulated signals are then, in turn, passed to separate ports of the PBX switch 64.

Similarly, digitally multiplexed digital television signals received on cable 118 are demultiplexed by a demultiplexer 120 and supplied to separate digital/analog converters 122. The analog outputs of these devices are passed to separate ports of the PBX switch 64.

The data and television network according to the invention is operated as follows:

A workstation user selects the "VIDEO PBX" or "VPBX" icon from the "Windows" menu. A double click on the mouse brings the program up on the computer. A data signal is sent from the user workstation to the PBX controller which identifies the user to the controller and requests a call directory. A directory is displayed in Windows. The user selects the function required from the directory by positioning the select arrow using the mouse and double clicking. For example, there may be a choice of:

a) a TV or audio program.

b) a local user within the LAN complex.

c) a remote user, i.e., long distance.

If a TV program is selected, a request data packet is sent from the user workstation to the PBX controller. The controller checks against an internal database to confirm that the user is authorized to receive the requested signal. If not, a message is sent to the user informing him. If authorized, the controller sends a control signal to the PBX to connect the user port and the source signal port. If another local user is called, the data request is routed to the PBX controller which, in turn:

a) Commands the PBX switch to loop back the callers television signal (caller preview).

b) Sends an information signal to the caller (a graphical box) indicating a call to a particular workstation is being initiated.

c) Calls up a WAV or MIDI file which is sent to the caller. This is a telephone ringing tone normally heard when the telephone rings.

d) Sends an information signal to the called party in the form of a graphical box indicating that there is a call coming in from a particular workstation.

e) Calls up a WAV or MIDI file which is sent to the called party. This is a telephone ringing sound normally heard when the telephone rings.

f) The called party may accept the call by moving the mouse arrow to the answer box and clicking, or may send busy by selecting the busy box.

g) A full motion video call now takes place. Either party may hang up by selecting the VPBX icon which, when selected, presents a hang-up option as menu. Upon click on hang-up, the call is terminated.

h) Multiple users may be conferenced in as a point-to-multipoint option with one user being the TV sender.

If a remote call is requested then:

a) The "teleconference" selection is made which causes a long distance menu on directory to be displayed. This directory may be customized for each user.

b) The PBX controller checks for a free unused codec. If all are busy then a busy graphic is sent back to the user. If a unit is free then the normal controls and features accessible from a video conferencing room are extended back to the user workstation.

c) Clicking the mouse provides on the called party name causes the codec to signal to the Telephone Company line equipment to set up the connection to the remote conference user.

d) If the remote use is in a video conference room then remote camera control is extended to the caller. The call then proceeds until either party hangs up.

If the call is to a remote workstation user then the remote codec is connected via the remote PBX to the remote workstation.

Data control signal (supervisory and control) are routed via an auxiliary low speed data channel associated with the video conferencing codec system.

The operation of the system described above is implemented by software programs stored in each workstation and in the PBX controller. These programs function in the manner indicated in flow chart form in FIGS. 7–9. These flow charts are essentially self explanatory; however, a brief explanation thereof is given below.

Figure 7B:
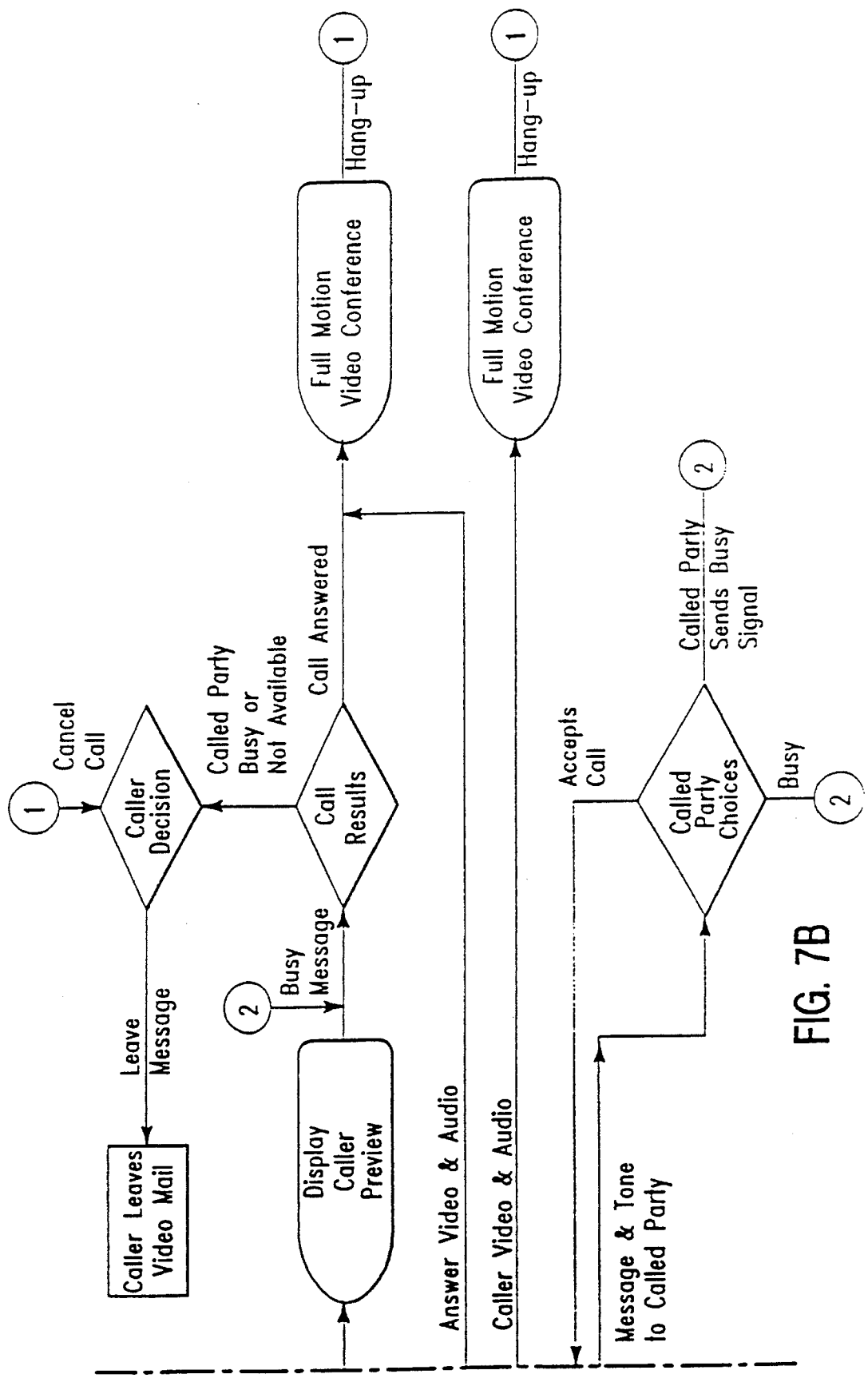
FIG. 7 is a flow chart of the workstation and PBX controller software for operating the data and television network to place a local call.

Referring to FIG. 7, the process of using the data and television network according to the invention commences when a caller selects the system from the workstation menu with the aid of the icon.

Upon selection, a directory is retrieved from the PBX controller and is displayed on the workstation image display with any messages that may be attached. Thereafter, the caller can either cancel the call, select a TV or audio program source or select a local call to another workstation. If a program source is selected, the PBX controller checks to make sure that the caller is authorized to receive this program and, if so, it controls the PBX switch to pass the program source through to the caller.

If a local call is selected, the PBX controller controls the PBX switch to loop back the caller's outgoing video and audio signal to the caller workstation so that the caller can preview what the called party will receive. After this preview, the call is made to the called party and if no answer is received, or if the called party is busy, a busy or not available message is sent to the caller. At this point, the caller has the option of either leaving a message (video mail) or cancelling the call.

When the called party receives a call, he or she has the option of accepting the call or sending a busy signal back to the caller. If the call is accepted, the workstation program of the called party sends a message to the PBX controller which connects the two parties via the PBX switch. A full motion video conference then proceeds until one or both parties hang up.

Figure 8B:
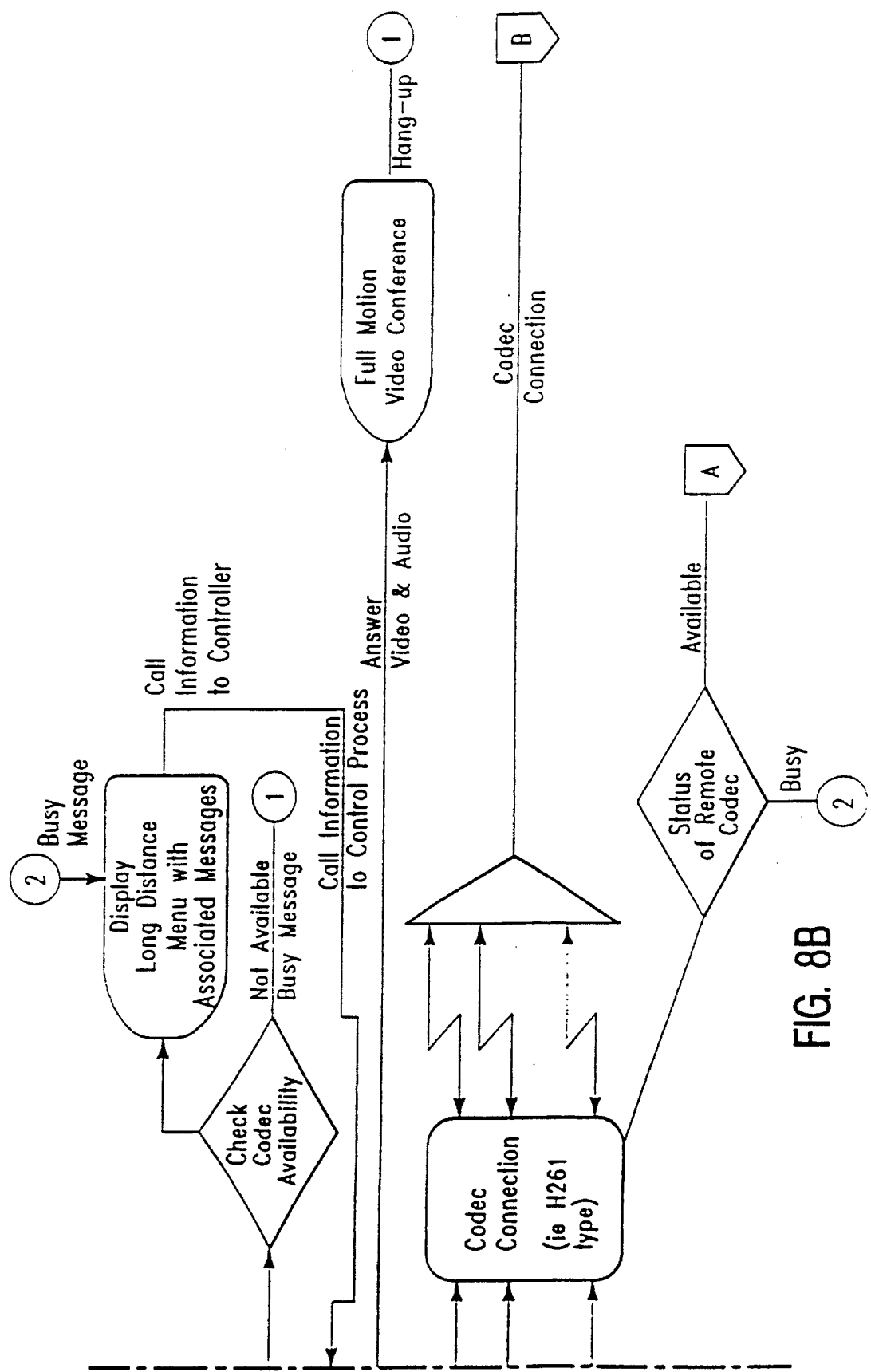
FIG. 8 is a flow chart of the workstation and PBX controller software for operating the data and television network to place a call to a workstation at a remote location.

A call to a remote workstation, i.e., a workstation outside the local area network, proceeds in essentially the same manner except that use is made of the video codec. FIG. 8 illustrates the calling process at the local site while FIG. 9 illustrates the process at the remote workstation site.

If a call to a remote site is selected, the PBX controller first initiates a "codec check". It determines whether a codec is available and, if so, it causes the local workstation to display the long distance menu. If not, a busy message is indicated.

Thereafter, the caller proceeds through the menu and places a call to the remote workstation. In so doing, the PBX controller causes the PBX switch to connect the caller workstation to the available codec so that transmission can be initiated.

Figure 9:
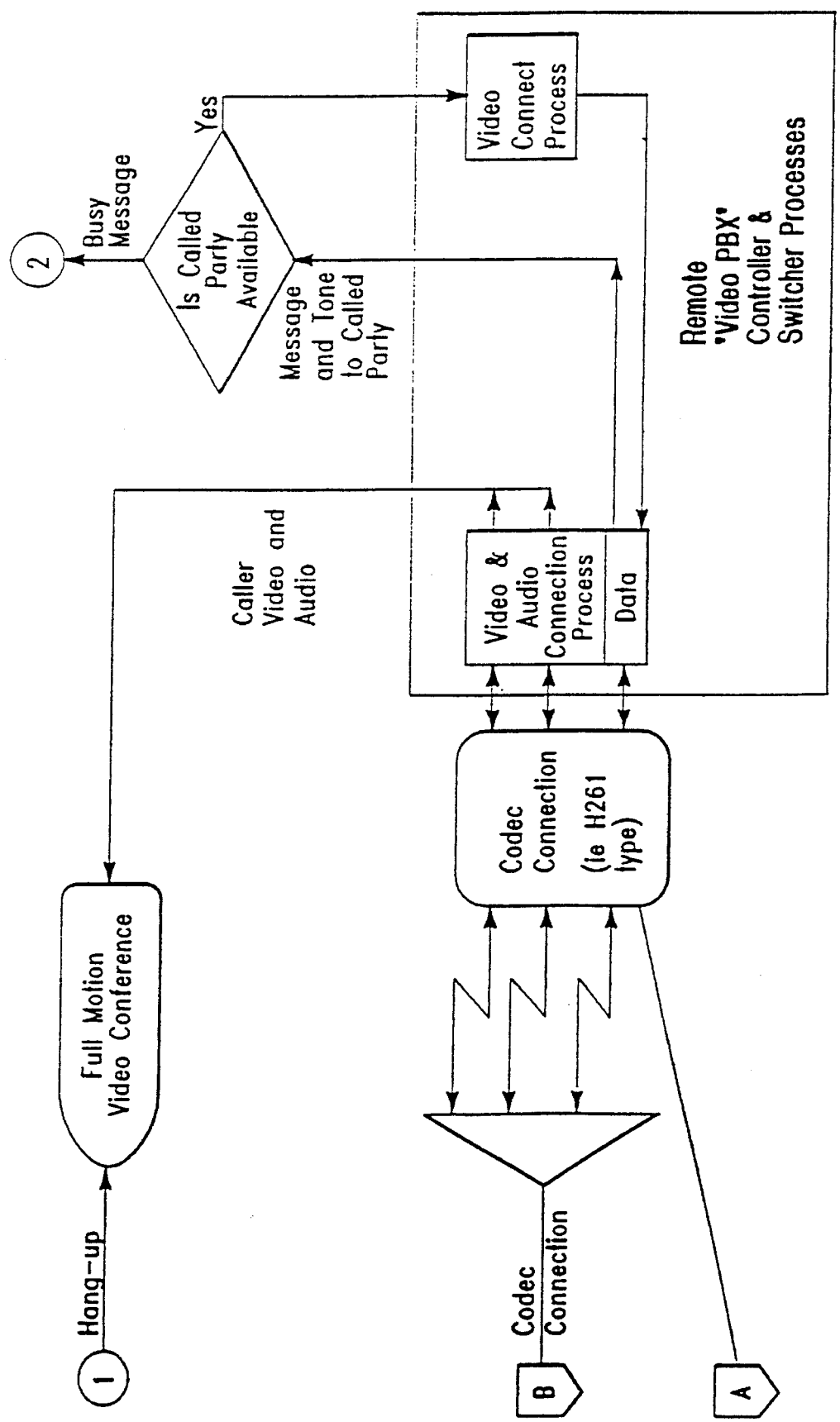
FIG. 9 is a flow chart showing the connection process at the remote location.

At the receiving end, as shown in FIG. 9, an incoming call on the telephone company network activates the codec and, if the latter is not busy, causes it to receive the multiplexed video audio and data.

There has thus been shown and described a novel data and television network for digital computer workstations which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A data and television network for digital computer workstations, wherein each workstation includes:

(1) an image display;

(2) a sound transducer;

(3) a digital computer for processing data, connected to supply image and control signals to said display for displaying data thereon;

(4) circuit means for converting a television signal into image and control signals supplied to said display for displaying a video image on said display and into audio signals supplied to said transducer for producing associated sound on said transducer;

(5) a first port connected to said computer for transmitting and receiving data signals;

(6) a second port connected to said circuit means for receiving television signals;

said network comprising, in combination:

(a) a local area network (LAN) having a plurality of third ports for transmitting and receiving data signals and having means for interconnecting said third ports;

(b) a private branch exchange (PBX) having a plurality of fourth ports for transmitting and receiving television signals; switch means, connected to said fourth ports, for selectively connecting each fourth port with any other fourth port; and control means, connected to said LAN and to said switch means, for decoding data messages received from a workstation via said LAN and controlling the interconnection of said fourth ports by said switch means in response thereto;

(c) cable circuit means connecting said first port of each workstation with one of said third ports of said LAN for transmitting data signals therebetween and connecting said second port of each workstation with one of said fourth ports of said PBX for transmitting television signals therebetween; and (d) software program means, stored in and operable on said computer of each workstation, for generating data messages to be transmitted via said LAN to said control means of said PBX.

2. The data and television network defined in claim 1, wherein each television signal is a full motion analog signal.

3. The data and television network defined in claim 1, wherein a directory of program sources is stored in said control means, and wherein said directory is retrieved via said LAN by said software program means for display on the image display of a workstation, to permit program selection by the user.

4. The data and television network defined in claim 1, wherein said software program means is menu driven.

5. The data and television network defined in claim 1, further comprising modem means connected between one of said third ports of said LAN and a telephone network, for transmitting and receiving data signals to a remote location via said telephone network.

6. The data and television network defined in claim 5, further comprising a plurality of said modem means, each connected between a separate one of said third ports of said LAN and said telephone network.

7. The data and television network defined in claim 1, wherein each workstation has an associated address and wherein each data messages includes the address of the workstation from which it originates.

8. The data and television network defined in claim 1, further comprising a television program source connected to one of said fourth ports of said PBX for providing a television signal representing a given television program for selective distribution to one or more workstations.

9. The data and television network defined in claim 8, further comprising a plurality of said television program sources, each connected to a separate one of said fourth ports of said PBX.

10. The data and television network defined in claim 8, wherein said television program source includes means for selecting the given television program from among a plurality of available television programs.

11. The data and television network defined in claim 10, wherein said program selecting means is responsive to a data message received from a workstation.

12. The data and television network defined in claim 11, wherein said television program source is further connected to one of said third ports of said LAN, and wherein said data message is transmitted via said LAN and includes the identity of said given television program.

13. The data and television network defined in claim 9, wherein said television program source includes a cable input carrying a plurality of frequency multiplexed television signals, and a plurality of demodulators for demodulating at least some of said television signals to a baseband frequency, each demodulator being coupled to a separate one of said fourth ports of said PBX.

14. The data and television network defined in claim 9, wherein said television program source includes and input carrying a plurality of digitally multiplexed, digitally encoded television signals, a digital demultiplexer for demultiplexing at least some of said digitally multiplexed television signals, and a plurality of digital-to-analog converters, each connected to said demultiplexer for converting one of said digitally encoded television signals into an analog television signal, each digital-to-analog converter being coupled to a separate one of said fourth ports of said PBX.

15. The data and television network defined in claim 1, further comprising a first modulator connected to one of said fourth ports of said PBX for modulating a baseband television signal received from said PBX into one of a plurality of channels at an elevated broadband frequency for transmission to one workstation.

16. The data and television network defined in claim 15, further comprising a first demodulator connected to the second port of said one workstation for demodulating said television channel at an elevated frequency received from said PBX into a baseband television signal for transmission to said one workstation.

17. The data and television network defined in claim 16, wherein said cable circuit means includes a television/data signal coupler at each end for combining baseband data signals received from said first port or third port, respectively, and broadband television signals received from said modulator or demodulator, respectively, onto a common transmission line for transmission to the opposite end thereof and for separating the baseband data signals and broadband television signals received from said opposite end of said transmission line into separate channels for providing data signals to said first port and third port, respectively, and said modulator or demodulator, respectively.

18. The data and television network defined in claim 1, wherein said workstation further includes a video camera including an image scanner and a microphone for producing a television signal representing the image and voice of a workstation user, and wherein said second port is connected to said video camera for transmitting the television signal received therefrom to said PBX.

19. The data and television network defined in claim 8, wherein each television signal is a full motion analog signal.

20. The data and television network defined in claim 18, further comprising video codec means, connected between one of said fourth ports of said PBX and a wide area network (WAN), for digitally encoding and decoding television signals for transmitting and receiving encoded digital television signals to and from said WAN.

21. The data and television network defined in claim 20, further comprising a plurality of said codec means, each connected between a separate one of said fourth ports of said PBX and said WAN.

22. The data and television network defined in claim 20, wherein said WAN is a telephone network and wherein said data messages include the telephone number of a remote workstation connected to said telephone network.

23. The data and television network defined in claim 18, further comprising a second modulator connected to the second port of at least one workstation for modulating a baseband television signal received from said one workstation into one of a plurality of channels at an elevated broadband frequency for transmission to said PBX.

24. The data and television network defined in claim 23, further comprising a second demodulator connected to one of said fourth ports of said PBX for demodulating a television channel at an elevated frequency into a baseband television signal for transmission to said PBX.

25. The data and television network defined in claim 18, wherein each workstation has an associated address and wherein at least some of said data messages include the address of another local workstation connected to said PBX.

26. The data and television network defined in claim 18, wherein the software program means causes the control means to interconnect the incoming and outgoing signals of a common port, whereby the image of a workstation user will appear on the image display of that workstation.

* * * * *